INVENTOR
James H. Sherts
by
James C. Bradley
atty

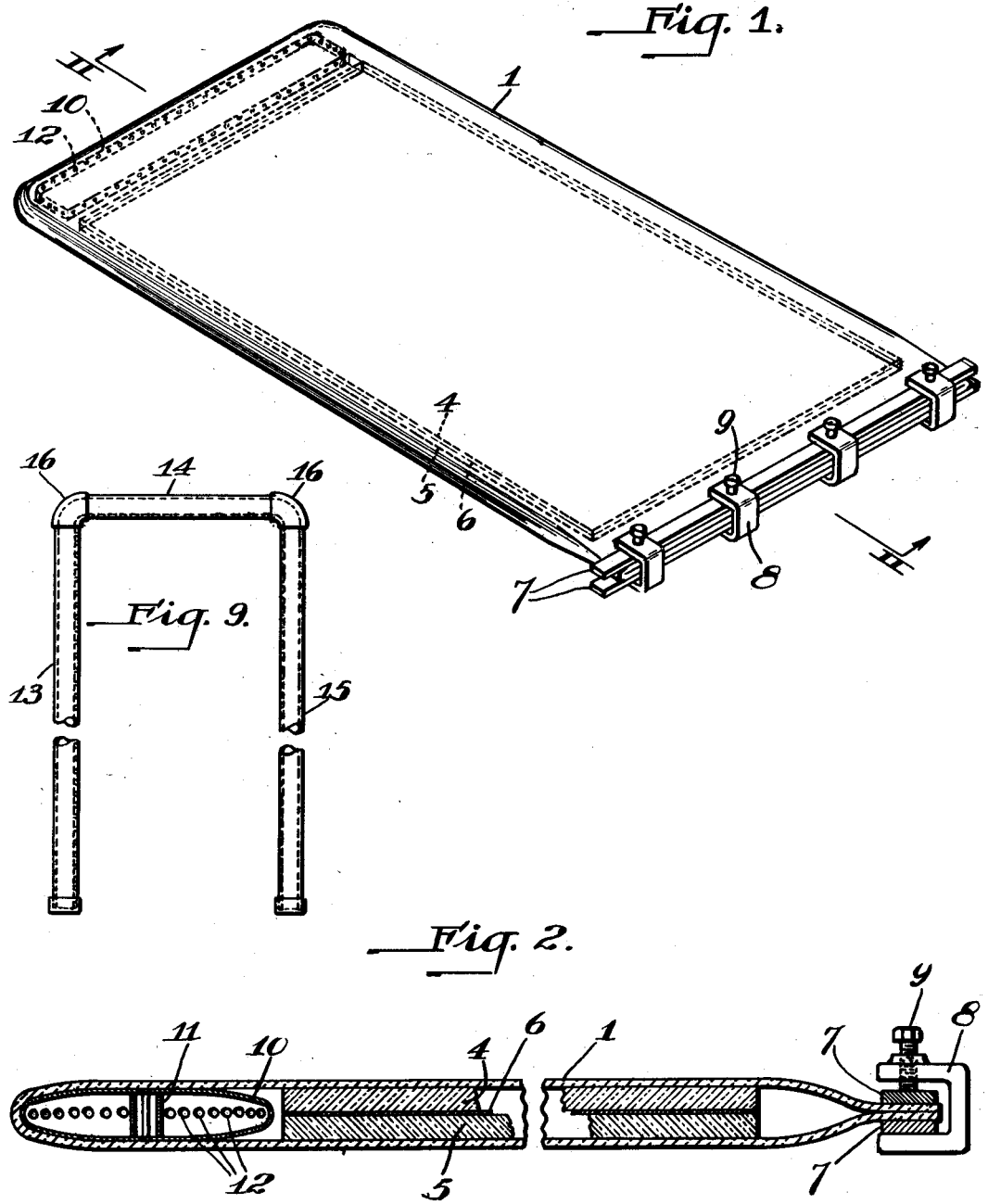
Dec. 9, 1930. J. H. SHERTS 1,783,985
APPARATUS FOR MAKING COMPOSITE GLASS
Filed Jan. 22, 1929   2 Sheets-Sheet 1
INVENTOR Dec. 9, 1930.  J. H. SHERTS  1,783,985
APPARATUS FOR MAKING COMPOSITE GLASS
Filed Jan. 22, 1929   2 Sheets-Sheet 2

Patented Dec. 9, 1930

1,783,985

UNITED STATES PATENT OFFICE

JAMES H. SHERTS, OF BRACKENRIDGE, PENNSYLVANIA, ASSIGNOR TO DUPLATE CORPORATION, A CORPORATION OF DELAWARE

APPARATUS FOR MAKING COMPOSITE GLASS

Application filed January 22, 1929. Serial No. 334,205.

Figure 3:
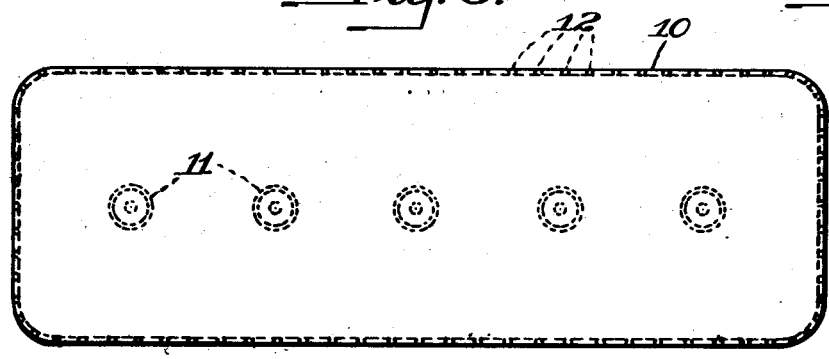
Figure 5:
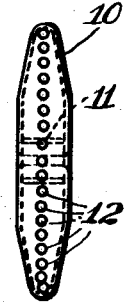
Figure 4:
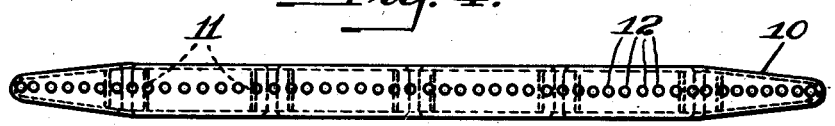
Figure 6:
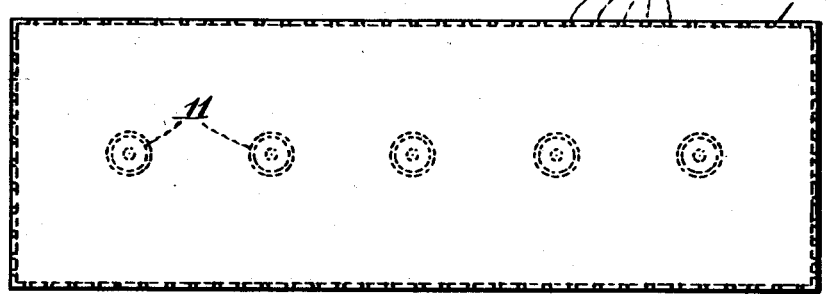
Figure 8:
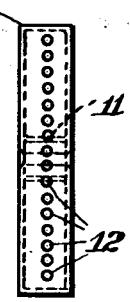
Figure 7:
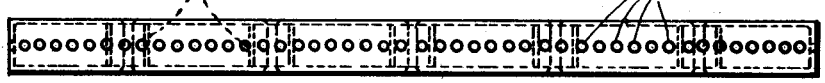

The invention relates to apparatus for making composite glass by the so-called rubber bag method. In practicing this method, the sheets of glass and pyralin plastic to be formed into a composite plate are placed in a flat rubber bag (a layer of cement being provided between the surfaces to be joined), and this bag is then placed in a pressure tank and exposed to hydraulic pressure of about 150 pounds per square inch, the water having a temperature such as to soften the cement to make it adherent and also to soften the plastic slightly. In order to make this process effective, it has been necessary to exhaust the air from the bag before the pressing operation, otherwise the air pressure inside the bag would rise to that in the tank outside the bag, and there would be the same fluid pressure on the edges of the sheets and between them tending to separate them as that applied to the outer faces of the outer sheets tending to press them together. The object of the present invention is to provide means whereby a differential of pressure between the inside and outside of the bag is secured without the necessity of exhausting the air from the bag. Briefly stated, this is accomplished by placing in the rubber bag with the sheets to be joined, a container or chamber preferably of sheet metal having perforated walls into which the air in the bag may flow when it is exposed to the pressure in the tank. The necessary differential in pressure between that applied to the faces of the sheets and that applied (by the air in the bag) against the edges of sheets and between them, is thus secured. This differential pressure is not equal to that secured when the air is exhausted from the bag by the method now commonly used, but is sufficient for securing a proper joinder of the sheets, and may be increased by increasing the tank pressure. The invention is illustrated in the accompanying drawings, wherein:

Figure 1 is a perspective view of a rubber bag equipped with the air chamber or container and ready for insertion into a pressure tank. Fig. 2 is a longitudinal section through the bag on the line II—II of Fig. 1. Figs. 3, 4 and 5 are detail views of the form of air chamber preferably used. Figs. 6, 7 and 8 are detail views of a modified form of air chamber. And Fig. 9 is a plan view of still another form of air chamber.

Referring to Figs. 1 and 2, 1 is a rubber bag opening at one end and carrying the three sheets 4, 5 and 6, which are to be jointed to form a composite plate, 4 and 5 being glass having their inner surfaces provided with thin layers of gelatin, or other cement, while 6 is pyroxylin plastic; such as, celluloid or pyralin. The bag is sealed by means of the bars 7, 7 with the clamps 8, 8, 8, 8 provided with set screws 9, 9, 9, 9.

Fitting into the closed end of the bag is the air chamber or container 10. This chamber is preferably of thin sheet metal, such as brass or copper, provided with staying or bracing means in the form of rivets and short pipe sections 11, although any suitable means may be employed for stiffening the walls against collapse when the bag 1 and its contents are placed in a pressure tank and exposed to the necessary pressure ranging from 150 pounds per square inch up. Perforations 12 are provided along the edges of the container in order to permit a free flow of air from the bag into the container when the bag is exposed to pressure in the tank. The edges of the container are preferably tapered, as indicated in Figs. 4 and 5, in order to reduce the tendency of the container to injure the bag during the pressing operation.

After the bag is sealed, the pressing operation proceeds in the usual manner, the bag being placed in a pressure tank and hot water is admitted and brought up to a pressure of 150 pounds per square inch or more. The air in the bag, under this condition of pressure, flows into the container 10 and the air pressure inside the bag applied against the edges of the sheets and between the sheets is thus substantially less than the pressure applied against the outer faces of the rubber bag which forces the inner faces of the sheets into contact. The difference in pressure between the inside of the bag and the outside of the bag may be brought up to any desired figure by increasing the pressure in the tank.

A rectangular container or box 12′ as illustrated in Figs. 6, 7 and 8, may be employed in place of the container 10, if desired, but is less desirable, because of the greater strain imposed upon the rubber bag when exposed to relatively high pressure in the pressure tank.

The air container may also be made from pipe in the form illustrated in Fig. 9, such container being made of the three pipe sections 13, 14 and 15, perforated along their inner sides and coupled together by the elbows 16, 16. The section 14 corresponds in length to the width of the rubber bag, while the sections 13 and 15 correspond in length to the length of the bag.

What I claim is:

1. In combination in apparatus for making composite glass, a rubber bag for carrying the sheets to be joined, means for sealing the bag, and an air chamber lying entirely inside the bag, said chamber having an opening into the bag to permit a flow of air to its interior, and being relatively rigid to prevent collapse when the bag is exposed to pressure in a pressure tank.

2. In combination in apparatus for making composite glass, a rubber bag for carrying the sheets to be joined, means for sealing the bag, and an air chamber having relatively stiff metal walls lying entirely inside the bag, said chamber having an opening into the bag to permit a flow of air from the bag to the interior of the chamber.

3. In combination in apparatus for making composite glass, a rubber bag for carrying the sheets to be joined, means for sealing the bag, and a flat metal box fitting inside the bag and having an opening into the bag, said box being tapered to a reduced thickness at its edges.

4. In combination in apparatus for making composite glass, a rubber bag for carrying the sheets to be joined, means for sealing the bag, and a flat metal box fitting inside the bag and having its wall along one edge provided with a series of perforations.

In testimony whereof, I have hereunto subscribed my name this 8th day of January, 1929.

JAMES H. SHERTS.